United States Patent
Piotrowski

(10) Patent No.: US 11,952,132 B2
(45) Date of Patent: Apr. 9, 2024

(54) SUPPLEMENTARY FUNCTION MODULE FOR AIRCRAFT

(71) Applicant: Lufthansa Technik AG, Hamburg (DE)

(72) Inventor: Pawel Piotrowski, Berlin (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 631 days.

(21) Appl. No.: 17/254,880

(22) PCT Filed: Jun. 27, 2019

(86) PCT No.: PCT/EP2019/067156
§ 371 (c)(1),
(2) Date: Dec. 22, 2020

(87) PCT Pub. No.: WO2020/002504
PCT Pub. Date: Jan. 2, 2020

(65) Prior Publication Data
US 2021/0261261 A1    Aug. 26, 2021

(30) Foreign Application Priority Data
Jun. 27, 2018 (DE) .................. 10 2018 115 472.0

(51) Int. Cl.
*B64D 27/24* (2006.01)
*H02J 1/04* (2006.01)
*H02J 13/00* (2006.01)

(52) U.S. Cl.
CPC ............. *B64D 27/24* (2013.01); *H02J 1/04* (2013.01); *H02J 13/00009* (2020.01); *B64D 2221/00* (2013.01); *H02J 2310/44* (2020.01)

(58) Field of Classification Search
CPC .............. B64D 27/24; B64D 2221/00; H02J 13/00009; H02J 1/04; H02J 2310/44
See application file for complete search history.

(56) References Cited

U.S. PATENT DOCUMENTS

| | | | |
|---|---|---|---|
| 7,307,520 B2 | 12/2007 | Lamon et al. | |
| 9,160,414 B2 | 10/2015 | Lekatsas et al. | |
| 9,678,488 B1* | 6/2017 | Dhondt | B64F 5/60 |
| 2007/0152628 A1* | 7/2007 | Lee | H04B 3/548 |
| | | | 324/142 |
| 2016/0329724 A1 | 11/2016 | Ibrahim | |

FOREIGN PATENT DOCUMENTS

| | | | | |
|---|---|---|---|---|
| CA | 1070767 A | 1/1980 | | |
| DE | 102006061455 A1 * | 6/2008 | | B60Q 3/47 |
| DE | 102006061455 A1 | 6/2008 | | |
| DE | 102012200487 A1 | 7/2013 | | |
| DE | 102014203157 A1 | 8/2015 | | |
| DE | 10066417 B3 | 8/2016 | | |

* cited by examiner

Primary Examiner — Jared Fureman
Assistant Examiner — Duc M Pham
(74) Attorney, Agent, or Firm — LEYDIG, VOIT & MAYER, LTD.

(57) ABSTRACT

A supplementary function module is for vehicles for the supplementation of a function module supplied with electrical power via a power supply bus. The supplementary function module is configured to be supplied with electrical power via the power supply bus. The supplementary function module has a controller configured to detect a voltage in the power supply bus, and to deactivate the supplementary function module based upon a first predefined voltage variation being detected.

17 Claims, 2 Drawing Sheets

SUPPLEMENTARY FUNCTION MODULE FOR AIRCRAFT

CROSS-REFERENCE TO PRIOR APPLICATIONS

This application is a U.S. National Phase Application under 35 U.S.C. § 371 of International Application No. PCT/EP2019/067156, filed on Jun. 27, 2019, and claims benefit to German Patent Application No. DE 10 2018 115 472.0, filed on Jun. 27, 2018. The International Application was published in German on Jan. 2, 2020, as WO 2020/002504 under PCT Article 21(2).

FIELD

The invention relates to a supplementary function module for vehicles, in particular commercial aircraft, and to an aircraft with a corresponding supplementary function module.

BACKGROUND

In commercial aircraft, but also in other vehicles, various function modules are provided as self-contained modules, designed for one or a plurality of predefined functions, which are simply connected to the electrical system of the commercial aircraft via a power connection and possibly also a data connection. Such modules often take the form of so-called line-replaceable units (LRU), which can be installed and removed in a few simple steps.

Examples of such a function module are the so-called passenger supply modules, which are arranged in the immediate vicinity of a passenger seat and can have various functions, depending on the requirement. In commercial aircraft, passenger supply modules are installed above each row of passenger seats. Among other items, they contain reading lamps and may also have switchable information signs, such as the seat belt sign. In addition, there are often one or a plurality of loudspeakers for on-board announcements by the pilot or the cabin crew. Oxygen masks, which, in the event of a drop in pressure in the cabin, fall out of an opening, can also be a part of passenger supply modules.

The passenger supply modules are supplied with electrical power via a power supply bus, and are regularly fitted with passenger-operated switches for switching the reading lamps on and off. To ensure that the reading lamps can be switched on and off at will, a voltage at a predefined level is permanently present on the power supply bus. If further functions in the domain of the passenger supply modules are to be retrofitted, these can basically be integrated into the passenger supply modules. If necessary, they can be supplied with electrical power via the power supply bus. The disadvantage here is that in order to provide new functions in the domain of the passenger supply modules, the passenger supply modules must be replaced or extensively reworked.

Depending on the function to be additionally provided, it may also be necessary, as a result of aviation law requirements, to be able temporarily to deactivate this supplementary function centrally under certain circumstances, such as during take-off and landing, and then to reactivate it again. Due to the voltage permanently required in the power supply bus for the reading lamps of the passenger supply modules, it is not possible to switch off this power supply bus in order to deactivate—in this event all—the functions of a passenger supply module. In point of fact, in order to switch off individual functions in the course of a retrofit temporarily, a separate power supply for the supplementary functions would have to be laid to the passenger supply module, which could then be switched off without problems, or a control line for the activation and deactivation of the functions in question would have to be laid, which options routinely involve considerable effort.

The same applies to other function modules and their power supply bus.

SUMMARY

In an embodiment, the present invention provides a supplementary function module that is for vehicles for the supplementation of a function module supplied with electrical power via a power supply bus. The supplementary function module is configured to be supplied with electrical power via the power supply bus. The supplementary function module has a controller configured to detect a voltage in the power supply bus, and to deactivate the supplementary function module based upon a first predefined voltage variation being detected.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
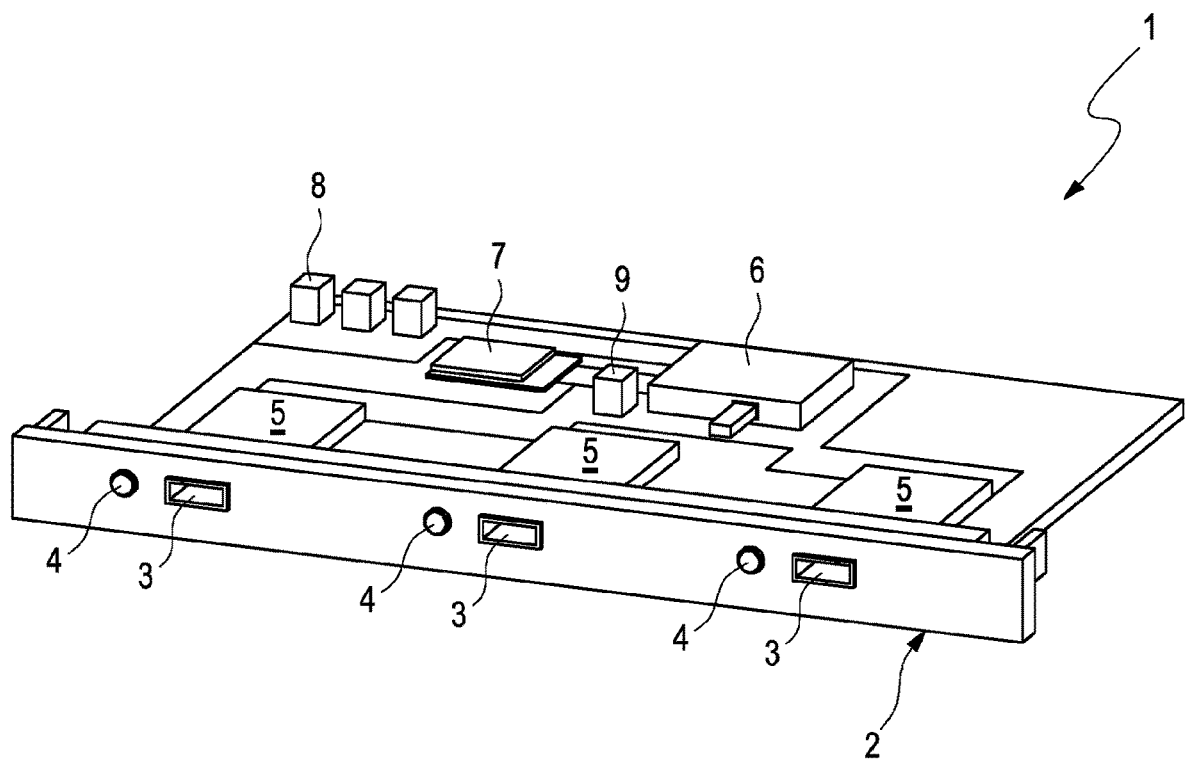
FIG. 1: shows a first example of embodiment of a supplementary function module in accordance with the invention.

Embodiments of the present invention create an option for the retrofit of supplementary functions in the domain of the function modules, in particular of an aircraft, in which the disadvantages of the prior art no longer occur, or only occur to a reduced extent.

Accordingly, embodiments of the present invention provide a supplementary function module for vehicles for supplementing a function module supplied with electrical power via a power supply bus, wherein the supplementary function module is designed to be supplied with electrical power via the power supply bus, comprising a control device with a detection module for the purpose of detecting the voltage in the power supply bus, wherein the control device is designed to deactivate the supplementary function module if a first predefined voltage variation is detected by way of the detection module.

Furthermore, an embodiment of the present invention provides an aircraft, in particular a commercial aircraft, comprising at least one function module, at least one supplementary function module, and a power supply bus for the supply of power to the at least one function module and the at least one supplementary function module, wherein the supplementary function module is designed in accordance with the invention.

The inventor has recognized that, even if the power supply bus and existing function modules are designed for a nominal voltage, and the power supply bus is designed to maintain this nominal voltage, the components are basically robust to voltage fluctuations, in particular in the downwards direction from the nominal voltage. In accordance with the invention, this insight is utilized in that the supplementary function module has a detection module for the purpose of detecting the voltage in the power supply bus to which the supplementary function module is connected, and is designed to detect a variation in this same voltage according to a predefined pattern. If a corresponding first predefined voltage variation is detected, the supplementary function module is deactivated, i.e. the function(s) provided by the supplementary function module are (at least partially) switched off, and are then no longer available to the passengers.

According to an embodiment, it is preferable if the reactivation of a previously deactivated supplementary function module takes place in a comparable manner to its deactivation. For this purpose, the control device is preferably designed to reactivate the supplementary function module if a second predefined voltage variation is detected by way of the detection module.

The first and the second predefined voltage variations can in principle be identical. However, it is preferable if the first and the second predefined voltage variations are different. This offers the advantage that, in the case of a large number of supplementary function modules, these can be transferred to a common activation state at least by the repetition of the first and/or second predefined voltage variation, even if a supplementary function module has initially not detected a voltage variation correctly, and as a consequence does not alter the activation state. Provided that there is no permanent malfunction of the supplementary function module, the desired activation state can usually be achieved by repeating the first or second specified voltage variation.

It is preferable if the first and/or second voltage variation comprises an interruption of the power supply, wherein the interruption is preferably shorter than 0.1 s, more preferably shorter than 0.05 s, more preferably shorter than 0.02 s. A corresponding interruption can be generated, for example, by an electronic switch that is appropriately controlled.

Alternatively or additionally, the first and/or second voltage variation may comprise a voltage modulation with a reduction of the voltage, wherein the reduction of the voltage is preferably 10% to 30%, more preferably about 20% of the nominal voltage, and/or the reduction is preferably for less than 0.1 s, more preferably for less than 0.05 s, more preferably for less than 0.02 s.

Correspondingly short interruptions or reductions in the power supply can regularly be "passed through" by function modules and supplementary function modules without thereby impairing the functionality of the modules. In the case of reading lamps of a function module, the interruption or reduction of the power supply lies below the perception threshold, at least within the specified durations, i.e. even if a reading lamp should in principle flicker due to the power path or drop, this flickering is so short that it cannot be perceived by the human eye. Needless to say, it is possible that the first and/or second voltage variation comprises a plurality of interruptions and/or reductions of the power supply in a respectively predefined pattern.

Alternatively or additionally, the first and/or second voltage variation may comprise a voltage modulation with a sinusoidal voltage, wherein the frequency of the sinusoidal voltage is preferably less than 400 Hz, preferably less than or equal to 200 Hz, more preferably less than or equal to 50 Hz, wherein the amplitude is preferably less than 5% of the nominal voltage. By virtue of an appropriately low frequency, the risk of the occurrence of an electromagnetic incompatibility in other devices due to the voltage modulation of the power supply bus is very low.

The function module can take the form of a passenger supply module, which means that the supplementary function module is a supplementary passenger supply module.

In embodiments, it is preferable if the supplementary function module has at least one socket of an electrical plug connection, preferably a standardized socket, more preferably a USB socket, for the connection of external loads. In this case, the load to be supplied with electrical power is not directly part of the supplementary function module, but rather an external device, such as a passenger's mobile device, for example. The passenger can operate his or her mobile device, and/or charge its energy storage device, via the supplementary function module.

It is also preferable, in embodiments, if the supplementary function module has at least two, preferably at least three, sockets. In particular, if the function module to be supplemented takes the form of a passenger supply module that regularly supplies to more than one seat or passenger, it is advantageous if the supplementary function module is also designed to supply to more than one seat or passenger.

Alternatively or additionally, the supplementary function module may have a sensor and/or a camera. The data recorded by the at least one sensor, and/or the at least one camera, are preferably temporarily stored on a memory module provided directly in the supplementary function module. If required, the memory module can be read out via any data connection that does not necessarily have to be permanent, e.g. via a wireless or wired data connection that can be optionally established during the maintenance of an aircraft.

The supplementary function module can also be designed for any other functions.

In embodiments, is preferable if the supplementary function module is designed as a power switch, which can be arranged between the power supply bus and a function module, and is designed to pass electrical power from the power supply bus to the function module. In an appropriate configuration, the supplementary function module can simply be interposed between the power supply bus and the function module, without the requirement of any changes to the power supply bus and the function module. The installation of such a single physical unit is very simple:

Disconnection of the connection of the function module to the power supply bus;
Connection of the supplementary function module to the power supply bus (e.g. at the previous connection point of the function module); and
Connection of the function module to the supplementary function module.

For an explanation of the aircraft according to the invention, reference is first made to the above statements.

The aircraft may comprise a signal transmitter unit, with which a predefined voltage variation is introduced into the power supply bus as required. The voltage variation can take the form of the first or second predefined voltage variation, which can be detected by the supplementary function module of the invention as a signal for activation or deactivation.

The request can be made by actuating a switch, or similar, directly on the signal transmitter unit. However, it is also possible for the signal transmitter unit to have a data transfer connection, via which appropriate requests can be transmitted to the signal transmitter unit. The triggering of a request can then be integrated into other operating elements already present in the aircraft, e.g. touch screens.

Figure 2:
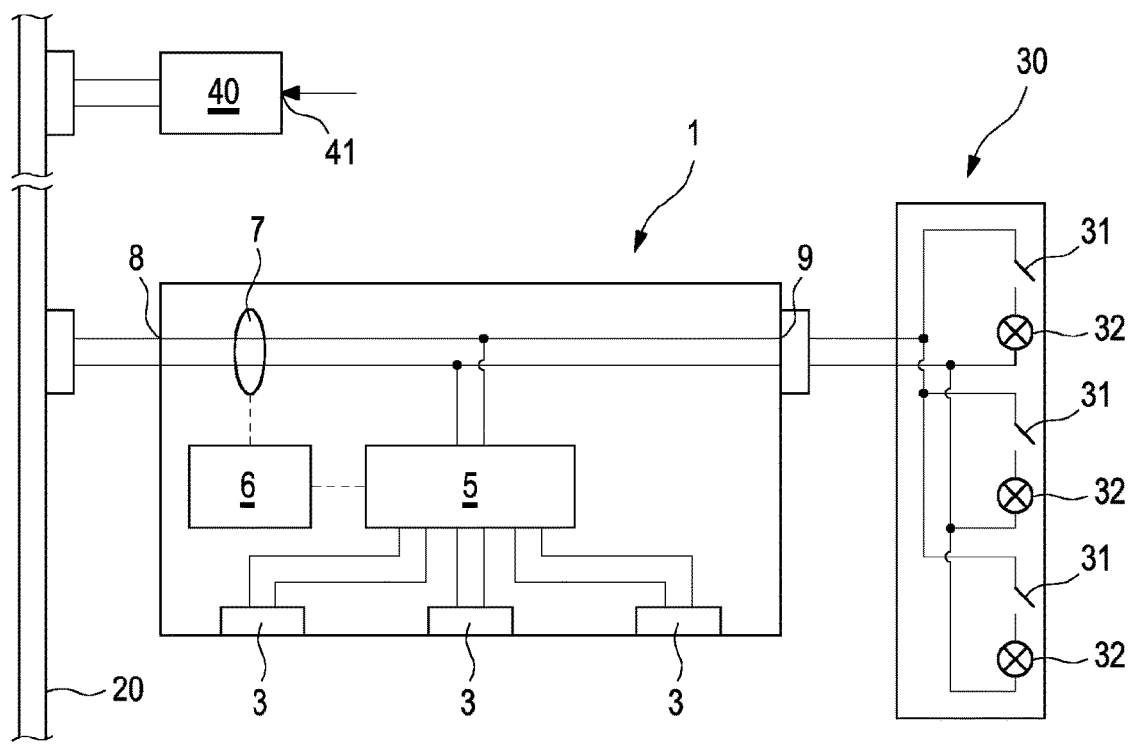
FIG. 2: shows a schematic representation of the supplementary function module from FIG. 1 in the installed state.

FIGS. 1 and 2 show an example of embodiment of a supplementary function module 1 in accordance with the invention. The supplementary function module 1 is a supplementary passenger supply module and is configured to be installed above passenger seats in a commercial aircraft, in addition to a passenger supply module known from the prior art, as a function module 30 comprising reading lamps 32 that can be switched by way of switches 31 (cf. FIG. 2). The supplementary function module 1 is electrically connected between a power supply bus 20 and a function module 30, for which purpose the supplementary function module 1 is designed as a power switch (cf. FIG. 2).

On the panel 2, which is accessible from the exterior in the installed state of the supplementary function module 1, three USB sockets 3 are provided for the connection of a passenger's mobile devices, for purposes of charging them. In addition to the USB sockets 3, in each case an indicator light 4 (shown in FIG. 1) is provided, which can optionally light up red or green, and which indicates whether a mobile device connected to a USB socket 3 is actually being charged (green), or whether there is currently insufficient power available to charge the mobile device (red).

The supplementary function module 1 has a current regulator 5 distributed over the supply lines of the individual USB sockets 3, with which the power flow to or via the USB sockets 3 can be individually set. For reasons of clarity, the current regulator 5 is shown as a single unit in FIG. 2. The current regulator 5 is controlled by a control device 6. In particular, the current regulator 5 can be set to zero so that no power is directed to the USB sockets 3. In this case, the supplementary function module 1 is considered to be deactivated.

The detection unit 7 connected to the control device 6 is designed to detect the voltage in the power supply bus 20 and, in particular, to detect voltage variation in the power supply bus 20. If a predefined voltage variation is detected by the detection unit 7, the supplementary function module 1 is either deactivated or (re)activated by the control device 6.

A signal transmitter unit 40, which is arranged on the power supply bus 20 in a manner comparable to a function module 30 or a supplementary function module 1, is provided for the introduction of the predefined voltage variations required for this purpose into the power supply bus 20. The signal transmitter unit 40 has electronic switches, so that the voltage in the power supply bus 20 can either be interrupted for a short time, namely for 0.05 s. By virtue of the brevity of the interruption of the voltage in the power supply bus 20, it is ensured, on the one hand, that reading lamps 32 operated across the interruption do not flicker, at least perceptibly, and on the other hand, that no fuses of the power supply bus 20 are activated. To trigger a voltage variation, the signal transmitter unit 40 has a data input 41, by way of which requests for voltage variation can be transmitted to the signal transmitter unit 40.

Figure 3:
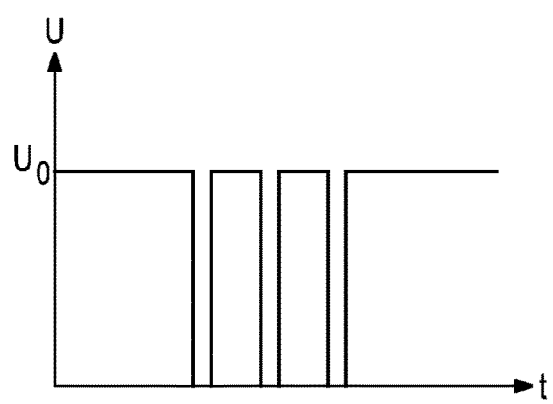
FIGS. 3a and 3b: show schematic representations of a first and a second voltage variation.
Figure 3:
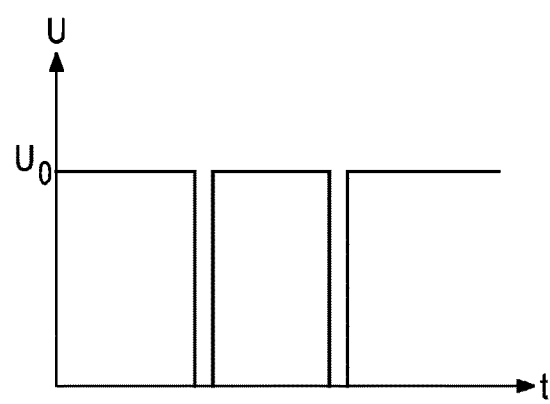

FIGS. 3a, b show examples of two possible voltage variations, one of which (FIG. 3a) is provided for the deactivation of a supplementary function module 1 according to FIGS. 1 and 2, while the other (FIG. 3b) is provided for the reactivation of a supplementary function module 1 according to FIGS. 1 and 2. Here the two voltage variations are different so that they can be clearly distinguished by the detection module 7, or the control device 6 of the supplementary function module 1.

In the course of the voltage variation for the deactivation of a supplementary function module 1, the voltage in the power supply bus 20, as sketched in FIG. 3a, starting from the nominal voltage $U_0$, is interrupted a total of three times for 0.2 s in each case in a 1-second cycle.

For the reactivation of a supplementary function module 1, the voltage variation comprises, starting from the nominal voltage $U_0$, in a 2-second cycle, two successive interruptions for 0.2 s in each case.

The detection module 7 and the control device 6 of the supplementary function module 1, from FIGS. 1 and 2, are designed to detect the voltage variations according to FIGS. 3a, b, and to control the current regulator 5 such that the activation state of the supplementary function module 1 is set as specified by way of the voltage variation. The detection module 7 and the control device 6 of the supplementary passenger supply module 1 have a sufficient electrical energy storage so as to ensure a sufficient self-contained supply during the short interruptions.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A supplementary function module for vehicles for the supplementation of a function module supplied with electrical power via a power supply bus, wherein the supplementary function module is configured to be supplied with electrical power via the power supply bus, the supplementary function module comprising:

a controller configured to detect a voltage in the power supply bus, and to deactivate the supplementary function module based upon a first predefined voltage variation being detected, wherein the supplementary function module is configured as a power switch, which is configured to be arranged between the power supply bus and the function module, and is configured to pass electrical power from the power supply bus to the function module by connecting the function module to the supplementary function module.

2. The supplementary function module as claimed in claim 1, wherein the control device is configured to reactivate the supplementary function module based upon a second predefined voltage variation being detected.

3. The supplementary function module as claimed in claim 2, wherein the first predefined voltage variation and the second predefined voltage variation are different.

4. The supplementary function module as claimed in claim 1, wherein the first predefined voltage variation or the second predefined voltage variation comprises an interruption of the voltage supply.

5. The supplementary function module as claimed in claim 4, wherein the first predefined voltage variation and the second predefined voltage variation comprise the interruption of the voltage supply, wherein the interruption is shorter than 0.1 s.

6. The supplementary function module as claimed in claim 1, wherein the first predetermined voltage variation or the second predetermined voltage variation comprises a voltage modulation with a reduction of the voltage.

7. The supplementary function module as claimed in claim 6, wherein the first predetermined voltage variation and the second predetermined voltage variation comprises the voltage modulation with the reduction of the voltage, wherein the reduction of the voltage is 10% to 30% of the nominal voltage.

8. The supplementary function module as claimed in claim 1, wherein the first predetermined voltage variation or the second predetermined voltage variation comprises a voltage modulation with a sinusoidal voltage.

9. The supplementary function module as claimed in claim 8, wherein the first predetermined voltage variation and the second predetermined voltage variation comprise the voltage modulation with the sinusoidal voltage, wherein the frequency of the sinusoidal voltage is less than 400 Hz, and wherein the amplitude is less than 5% of the nominal voltage.

10. The supplementary function module as claimed in claim 1, wherein the supplementary function module comprises at least one socket of an electrical plug connection for the connection of external loads.

11. The supplementary function module as claimed in claim 1, wherein the supplementary function module comprises a sensor or a camera, wherein data detected by the sensor or the camera is temporarily stored on a memory provided directly in the supplementary function module.

12. The supplementary function module as claimed in claim 1, wherein the supplementary function module is a supplementary passenger supply module for a passenger supply module designed as a function module.

13. An aircraft comprising:
   at least one function module;
   at least one supplementary function module; and
   a power supply bus configured to supply power to the at least one function module and the at least one supplementary function module,
   wherein the at least one supplementary function module comprises the supplementary function module according to claim 1.

14. The aircraft as claimed in claim 13,
   the aircraft comprising a signal transmitter configured to introduce a predefined voltage variation into the power supply bus.

15. The supplementary function module as claimed in claim 1, wherein the function module comprises a passenger supply module of an aircraft.

16. The supplemental function module as claimed in claim 15, wherein the passenger supply module comprises reading lamps.

17. A supplementary function module for vehicles for the supplementation of a function module supplied with electrical power via a power supply bus, wherein the supplementary function module is configured to be supplied with electrical power via the power supply bus, the supplementary function module comprising:
   a controller configured to detect a voltage in the power supply bus, and to deactivate the supplementary function module based upon a first predefined voltage variation being detected,
   wherein the first predefined voltage variation and the second predefined voltage variation comprise an interruption of the voltage supply, wherein the interruption is shorter than 0.1 s.

* * * * *